United States Patent
Langerak et al.

(10) Patent No.: US 6,341,699 B1
(45) Date of Patent: Jan. 29, 2002

(54) METHOD AND APPARATUS FOR SORTING CARPET OR SIMILAR TYPES OF MATERIAL

(75) Inventors: Edwin Langerak, Nuenen; Cornelis Verschut, Dieren; Johannes Fransiscus Van Middelkoop, Brummen, all of (NL)

(73) Assignee: Nederlandse Organisatie voor Toegepast-Natuurine Tenschappelijk (NL)

( * ) Notice: Subject to any disclaimer, the term of this patent is extended or adjusted under 35 U.S.C. 154(b) by 0 days.

(21) Appl. No.: 09/463,730

(22) PCT Filed: Jul. 30, 1998

(86) PCT No.: PCT/NL98/00437

§ 371 Date: Apr. 24, 2000

§ 102(e) Date: Apr. 24, 2000

(87) PCT Pub. No.: WO99/06160

PCT Pub. Date: Feb. 11, 1999

(30) Foreign Application Priority Data

Jul. 30, 1997 (NL) .............................................. 1006686

(51) Int. Cl.⁷ .............................................. B07C 5/342
(52) U.S. Cl. ...................... 209/617; 209/576; 209/577; 209/912; 209/903
(58) Field of Search ................................ 209/576, 577, 209/617, 912, 927, 903, 937

(56) References Cited

U.S. PATENT DOCUMENTS

| 4,943,198 A | 7/1990 | McCabe |
| 5,464,100 A | 11/1995 | Oka |

FOREIGN PATENT DOCUMENTS

| DE | 4316422 C1 | 8/1994 |
| DE | 19543134 A1 | 5/1997 |
| EP | 0372906 A2 | 6/1990 |
| WO | WO 9702481 | 1/1997 |

OTHER PUBLICATIONS

A. Frankenberg: "Verwertung von textgilen Teppichabfallen," Melliand Textilberichete, International Textile Reports., No. 10, 1996, pp. 679–681, XP000629618, Heidelberg DE.

*Primary Examiner*—Donald P. Walsh
*Assistant Examiner*—Jonathan R. Miller
(74) *Attorney, Agent, or Firm*—Needle & Rosenberg, P.C.

(57) ABSTRACT

The invention relates to a method for sorting carpet or similar pieces of material to material type and the like, wherein the method comprises the following steps of: placing pieces of carpet on a transport system; disentangling or separating the pieces of carpet on a transport system; fixing pieces of carpet individually to a guide system; recognizing the type of carpet during movement along the guide system; and releasing a piece of carpet into or onto a relevant location determined by the recognition.

25 Claims, 6 Drawing Sheets

METHOD AND APPARATUS FOR SORTING CARPET OR SIMILAR TYPES OF MATERIAL

Carpet waste is increasingly becoming a problem. Despite the relatively long lifespan of floor coverings, 20% of the total quantity of collected bulky household refuse currently consists of carpet waste.

In many Western European countries developments in reuse of such carpet waste are now taking place.

The present invention provides a method for sorting carpet or similar pieces of textile to material type and the like, wherein the method comprises the following steps of:

placing pieces of carpet on a transport system;

disentangling the pieces of carpet on the transport system;

fixing pieces of carpet individually to a guide system;

recognizing the type of carpet during movement along the guide system; and releasing the pieces of carpet into a sorting container determined by the recognition.

The present invention further provides an apparatus for sorting carpet or similar pieces of material to material type and the like, comprising:

a transport system for supplying pieces of carpet;

a separating device for separating or disentangling the pieces of carpet;

a guide system to which pieces of carpet can be individually fixed;

an identification unit for recognizing the types of carpet during movement along the guide system; and releasing means for releasing a piece of carpet at the desired location.

Preferred embodiments of the present invention are designated in the dependent claims; important advantages hereof relative to the main claim relate to the possibility of carrying clamping means downward with little force over a part of a piece of carpet while this is being lifted automatically. In view of the possibly considerable weight of a piece of carpet, this prevents operative personnel developing neck, arm and back complaints.

Furthermore, it is an important advantage of the preferred embodiments stated in the dependent claims that the piece of carpet is placed in a predetermined position, whereby the recognition can take place in assured manner with optical means.

Further advantages, features and details of the present intention will be elucidated on the basis of the following description of a preferred embodiment thereof, with reference to the annexed drawing, wherein.

Figure 1:
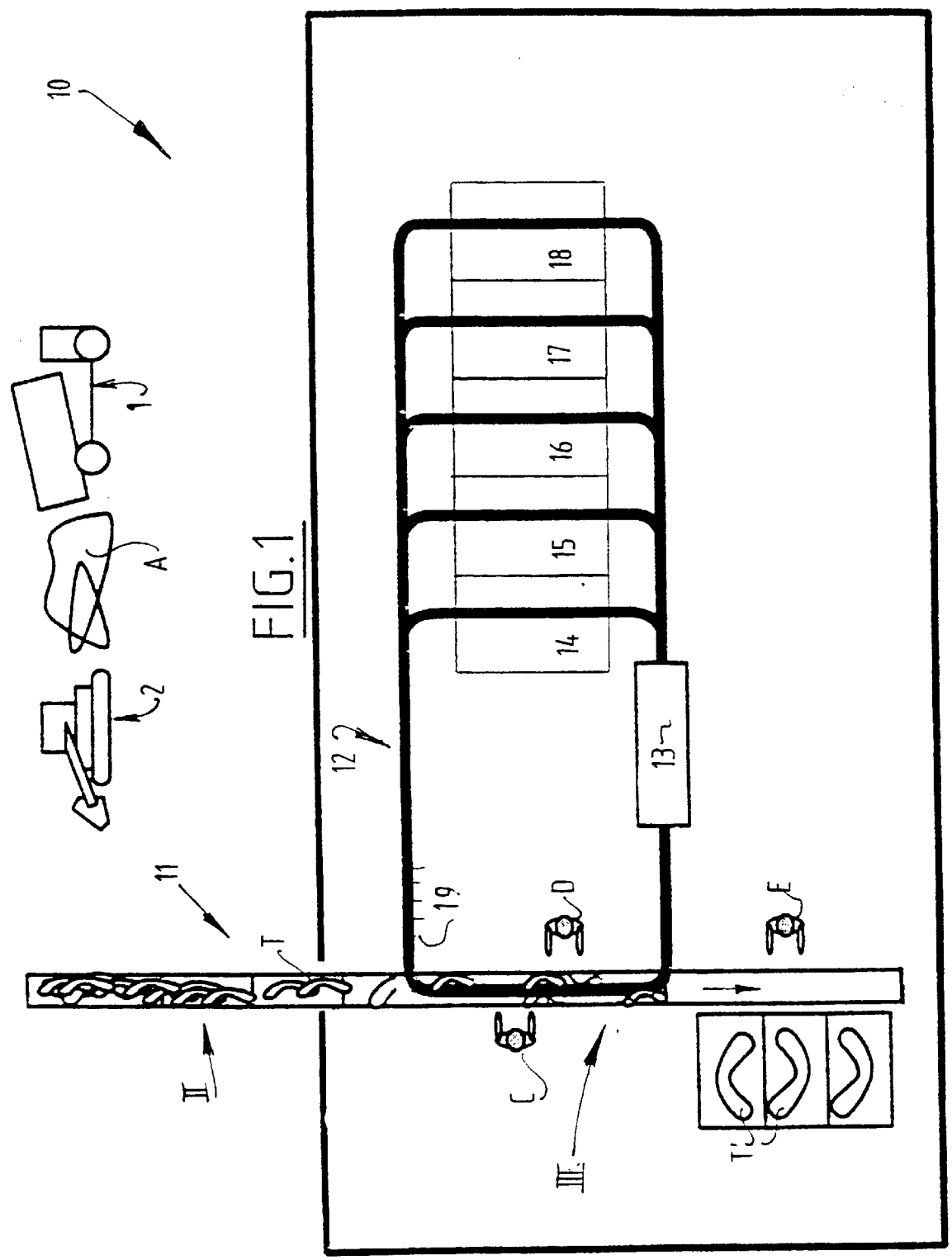
FIG. 1 shows a schematic top view of an apparatus and method according to the present invention.

A carpet heap A unloaded for instance from a freight vehicle I is transported with for instance a power shovel 2 to an apparatus 10 according to the present invention. In section 11 pieces of carpet T are separated as far as possible, whereafter they are suspended by personnel on carriages in a guide rail 12. After identification in an identification unit 13, the pieces of carpet, in accordance with their recognition, are transported to relevant receiving bins or discharge conveyors 14, 15, 16, 17 and 18 and offloaded therein/thereon.

In addition, operative E provides manual selection of carpet pieces T' which have not been suspended by operatives C and D, for instance due to the unsuitability therefor, i.e. the carpet pieces T' may be too large, too small, too heavy and so on.

Figure 2:
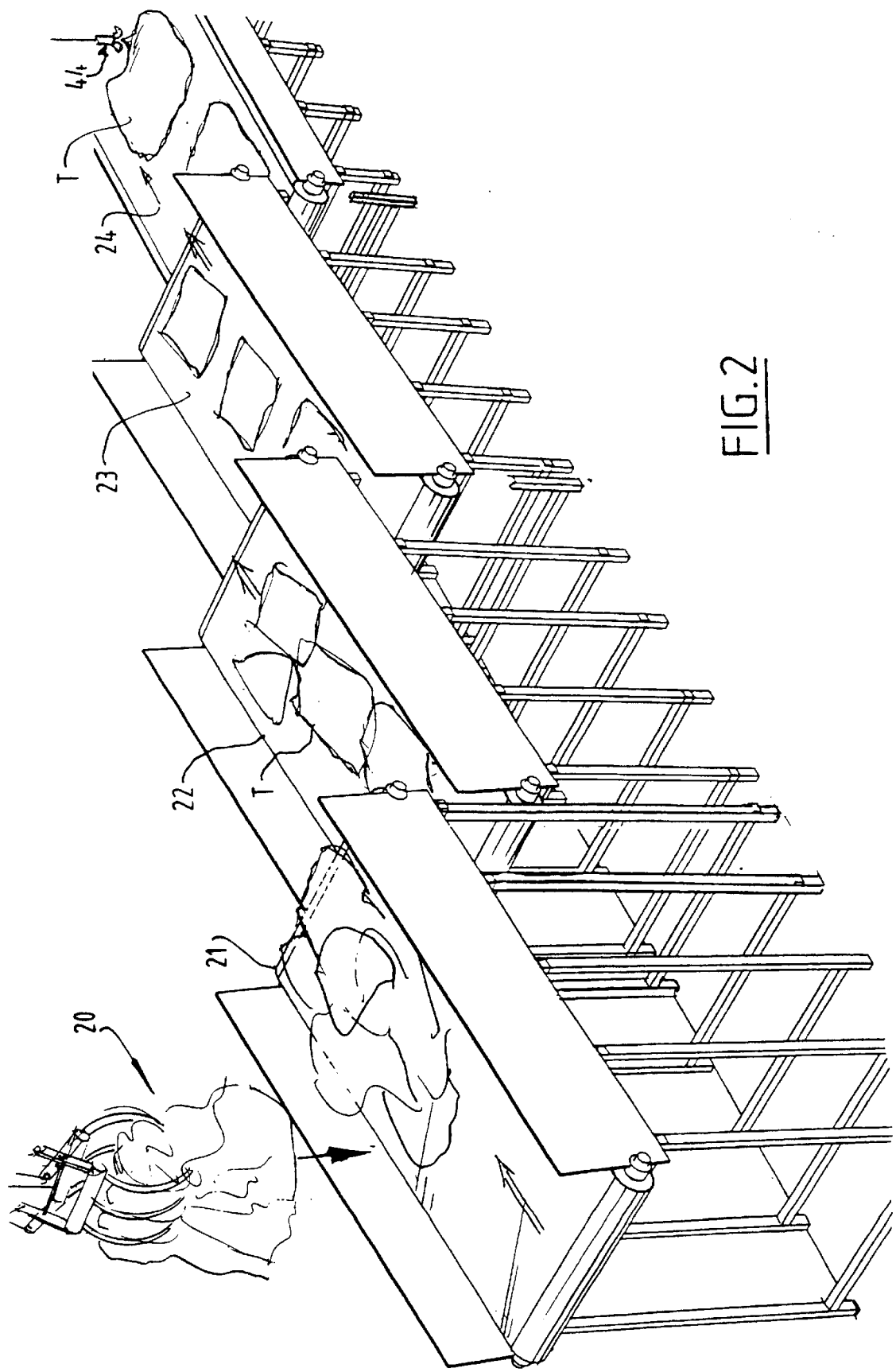
FIG. 2 shows a perspective view of detail II of FIG. 1.

As can be seen in FIG. 2, disentangling of the carpets, supplied for instance by a hoisting device 20, takes place using a number of conveyors 21, 22, 23 placed obliquely one behind another which are each driven at an increased speed relative to the preceding one. Feed conveyor 19 has a speed of for instance 20 m/hour, while outfeed conveyor 24 has a speed of for instance 500 m/hour, while the speed of the conveyors 21, 22 and 23 lies somewhere between these. As shown schematically in FIG. 2, the carpets T are mutually separated by the individual conveyors 21, 22 and 23 and the lying, oblique arrangement (at a relatively small angle).

Using an electronic control system the speed of conveyors 21, 22, 23 can be adapted in order to arrive at an optimum separation. When for instance a gap occurs in the supply, the speed of the preceding conveyors is increased.

An alternative embodiment of the conveyors is formed by the use of vibrating conveyors, whereby the carpet portions are shaken apart.

Figure 3:
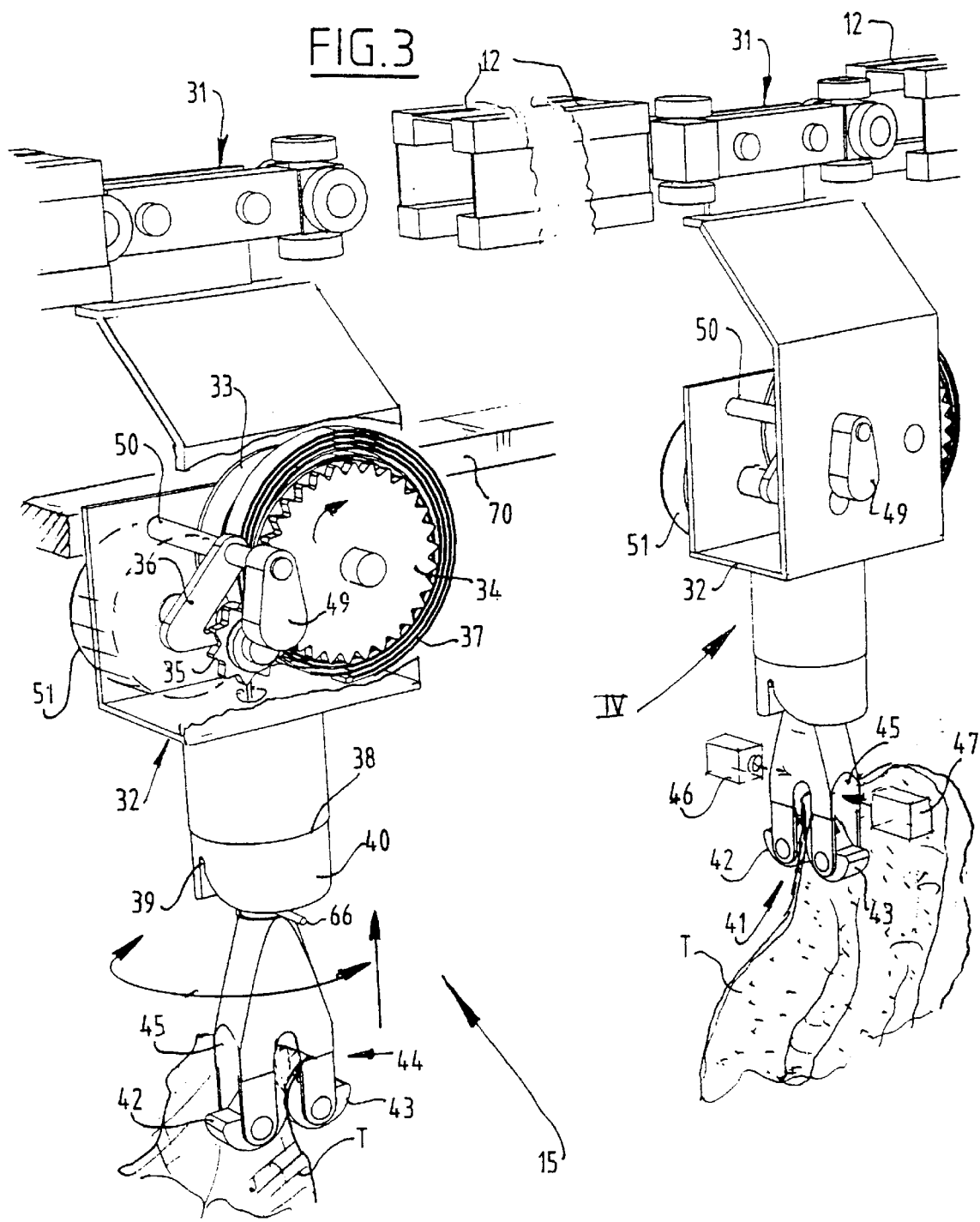
FIG. 3 is a perspective view of detail III of FIG. 1.
Figure 4:
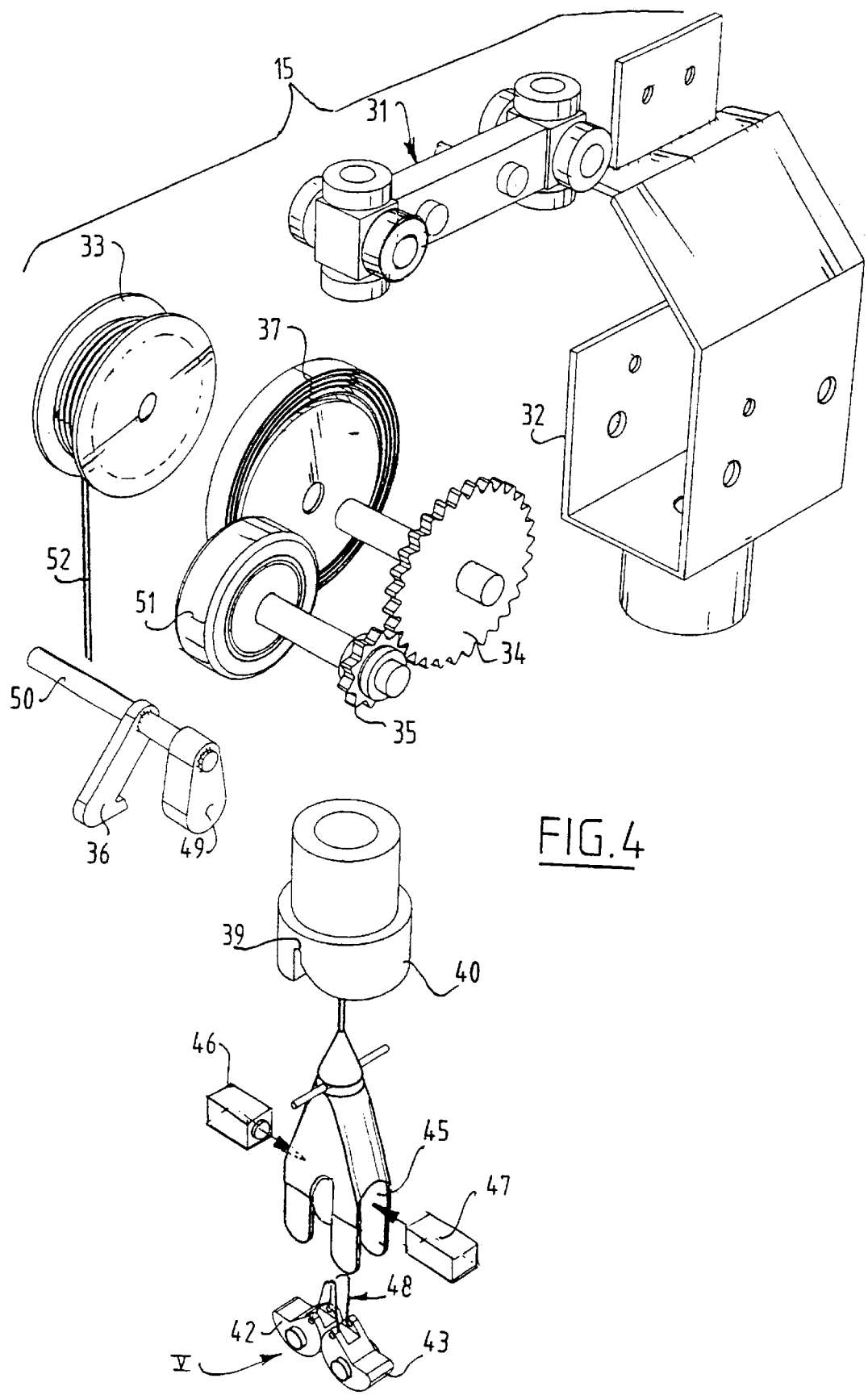
FIG. 4 is an exploded view in perspective of detail IV of FIG. 3.

In guide rail 12 (FIG. 3) carriages 31 are moved along in a manner not shown by means of a chain with carriers. Situated on each carriage is a housing 32 with a pulley 33 (see also FIG. 4), two mutually engaging toothed wheels 34 respectively 35, a blocking hook 36 and a spring element such as a clock spring 37. Situated on the underside of housing 32 is a positioning sleeve 38 having a recess 39 therein as well as a rounded lower part 40. Carpet pieces T are clamped in a clamp 41 which is provided with two clamping jaws.42 and 43 which are each pivotally mounted on clamp housing 44. Housing 44 is further provided with openings 45 on both sides for optical detection of both surfaces of a clamped carpet piece using detection units 46 and 47. It is in any case ensured that both sides or surfaces of a carpet piece can be detected at the position of the openings. At other locations it is possible for the same surface to be detected twice, which makes recognition of the type of the relevant carpet piece difficult if not impossible. As also shown in FIG. 4 (and also in FIG. 5), clamping jaws 42 and 43 are mutually connected using a spring 48 and two connecting pieces pivotally mounted thereon for holding these clamping jaws 42 and 43 in the neutral position. On the outside of housing 32 an operating pawl 49 is arranged on the same shaft 50 as blocking hook 36. On the opposite side of housing 32 is arranged a wheel 51, preferably coated with a material having a relatively high coefficient of friction in order to engage on a contact rail 70. Arranged on the upper side of clamp housing 44 are two protruding pins 66 which fit into recess 39.

Figure 5:
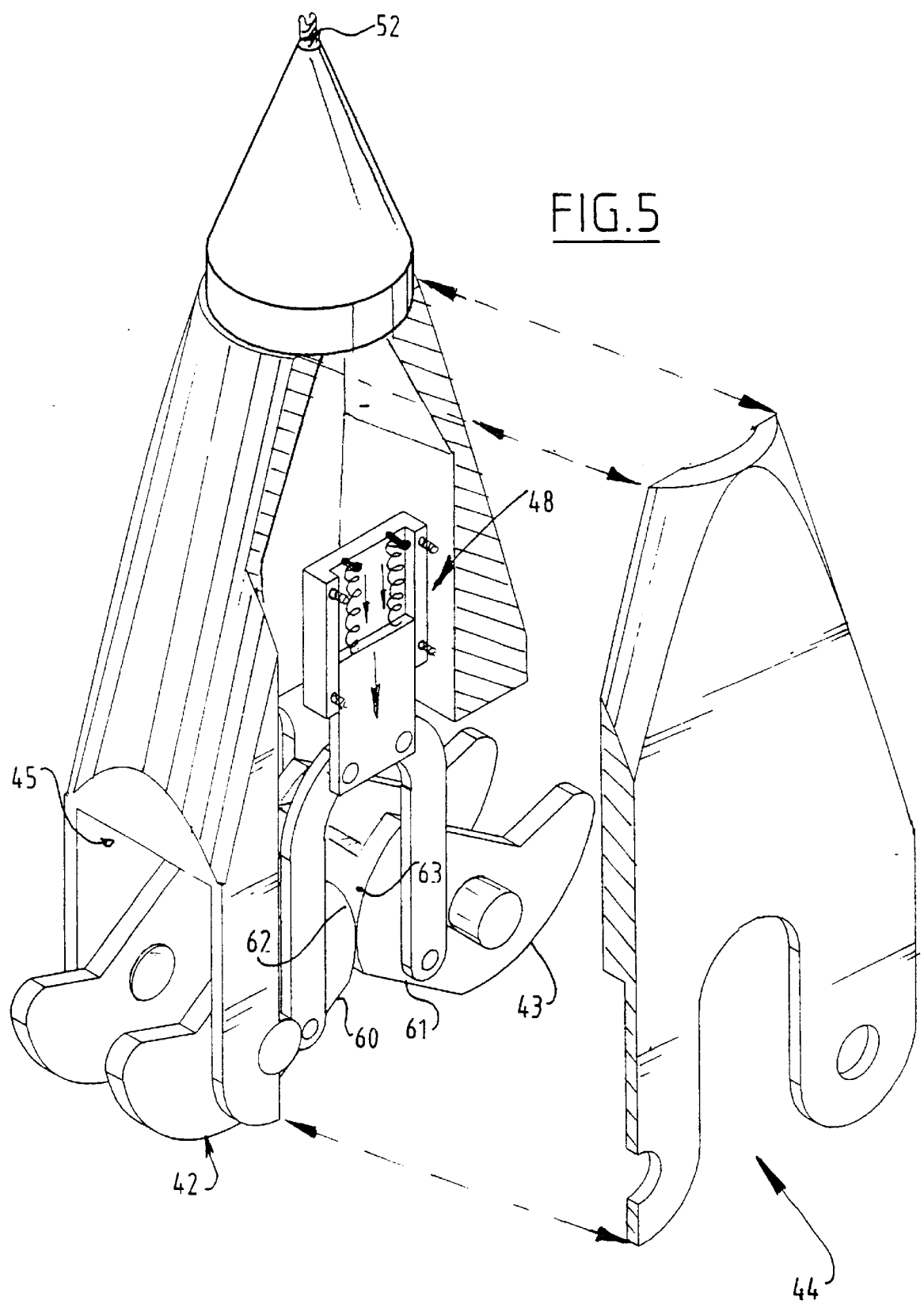
FIG. 5 shows a view in perspective of detail V of FIG. 4.

As can be seen in FIG. 5, clamping jaws 42 and 43 are partially provided with a rounded edge 62 respectively 63, in addition to two straight edges 60 and 61 lying mutually opposite. Spring 48 with pivoting connecting pieces ensures that clamping jaws 42 and 43 are held in the neutral position without opening 45 being obstructed.

Figure 6:
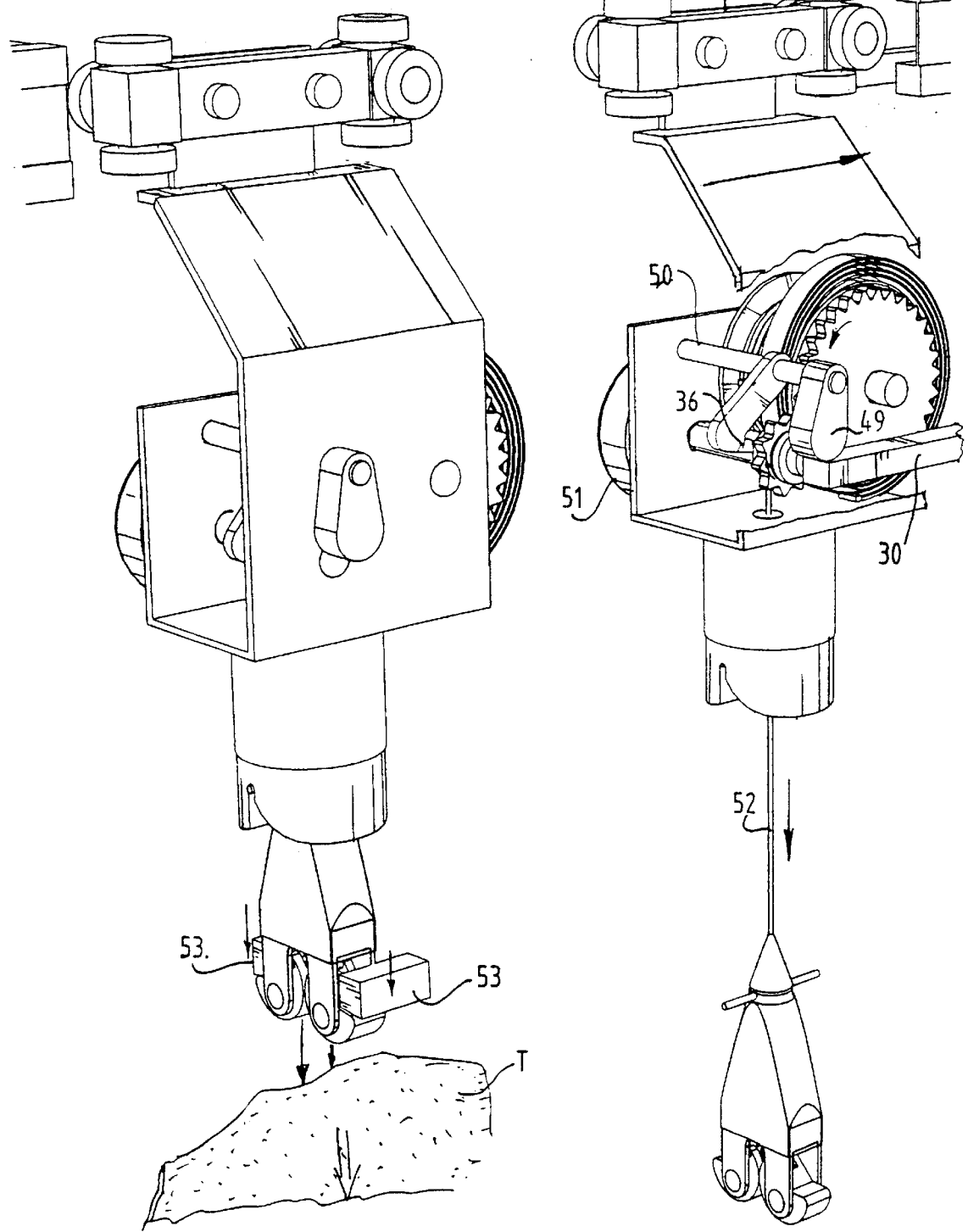
FIG. 6 shows a perspective view.

As indicated in FIG. 1, one empty clamping unit 19 at a time is situated close to the individuals C and D. In a manner as shown in FIG. 6, operating pawl 49 of a clamping unit 19 is operated by blocking rail 30 close to the individuals C and D, so that locking hook 36 is released from toothed wheel 35. Clamp housing 44 is then held in place by the action of clock spring 37. An operative can now manually take hold of housing 44 and pull it downward counter to the action of spring 37 in the direction of the arrow shown in FIG. 6 and clamp a piece of carpet T between clamping jaws 42 and 43, When carpet piece T is pushed upward, clamping jaws 42 and 43 will provide some space due to the flat edges 60 and 61 (FIG. 5) so that the carpet piece can easily be moved upward and clamped by the rounded edges 62 and 63 of clamping jaws 42 respectively 43.

As a carriage is moved along the friction wheel 51 is driven by a contact rail 70 placed thereabove so that the line 52 is moved upward on pulley 33, wherein the guide wall of sleeve 40 guides the pins 66 on the top part of clamp housing-44 into recess 39. Friction heads are preferably arranged in lying position on the inside of wheel 51 in order to prevent too much force being exerted on pins 66. When contact rail 70 and blocking rail 30 end as a carriage is moved further along, the clamp housing 44 remains in the moved upward position because blocking hook 36 blocks toothed wheel 35.

As the clamps with pieces of carpet T therein are moved further along they are guided past identification unit 13, wherein optical detection units 46 and 47 distinguish the kind or type of material on both sides of a piece of carpet. With continued movements along guide system 12 a piece of carpet is transported in a manner not shown by means of points to one of the receiving bins 14–18, where similar carpet pieces are collected for reuse. Release from the clamps can take place in the manner shown in FIG. 6 simply by moving the protruding parts of clamping jaws 42 and 43 downward, for instance by means of a mechanical pawl or rail 53, whereafter the pieces of carpet fall due to their own weight onto the desired location.

The present invention is not limited to the above described preferred embodiments thereof; the rights sought are defined by the following claims, within the scope of which many modifications can be envisaged.

What is claimed is:

1. Method for sorting carpet or similar pieces of material by type, wherein the method comprises the following steps of:

placing the pieces of material on a transport system;

fixing the pieces of material individually along the guide system;

transporting the pieces of material along the guide system;

recognizing the type of material during movement along the guide system; and, releasing a piece of material into or onto a relevant location determined by the recognition; characterized by disentangling or separating the pieces of material, consisting of pieces of carpet, on said transport system; and positioning the pieces of material in a predetermined position during transportation thereof for recognizing the type(s) of material of the carpet by an identification unit.

2. Apparatus for sorting carpet or similar pieces of material by types, comprising:

a transport system for supplying pieces of material;

a guide system to which pieces of material can be individually fixed and along which the pieces of material are transported;

releasing means for releasing a piece of material at a desired location; characterized by a separating device for separating or disentangling the pieces of material; and clamping means for bringing at least a part of the piece of material comprising one or more pieces of carpets in a predetermined position during movement thereof;

an identification unit for automatically recognizing the types of material of the positioned pieces of carpet during movement along the guide system; and releasing means for releasing a piece of carpet at the desired location, wherein the identification means control releasement of the pieces of carpet depending on the recognition.

3. Apparatus as claimed in claim 2, provided with one or more carriages, on each of which are arranged up and downward movable clamping means for fixedly clamping and releasing pieces of carpet.

4. Apparatus as claimed in claim 3, wherein the clamping means are provided with one or more guide surfaces for bringing a piece of carpet into a predetermined transverse position in the moved upward position of the clamping means.

5. Apparatus as claimed in claim 4, wherein the clamping means contain openings through which the types of carpet can be recognized.

6. Apparatus as claimed in claim 4, wherein the clamping means comprise two clamping members movable relative to each other.

7. Apparatus as claimed in claim 4, wherein the up and downward movement of clamping means takes place via a line and a pulley.

8. Apparatus as claimed in claim 4, wherein in a moved upward position the clamping means carry the pieces of carpet into a predetermined transverse position relative to an identification unit.

9. Apparatus as claimed in claim 4, wherein the movable clamping members can be moved into a neutral position by a resetting means.

10. Apparatus as claimed in claim 9, wherein the resetting means are formed such that they provide an unobstructed view through the openings provided in the clamping means.

11. Apparatus as claimed in claim 9, wherein the resetting means comprise spring means, which spring means are pivotally connected to the clamping members by means of connecting means.

12. Apparatus as claimed in claim 3, wherein the clamping means contain openings through which the types of carpet can be recognized.

13. Apparatus as claimed in claim 3, wherein the up and downward movement of clamping means takes place via a line and a pulley.

14. Apparatus as claimed in claim 3, wherein in a moved upward position the clamping means carry the pieces of carpet into a predetermined transverse position relative to a identification unit.

15. Apparatus as claimed in claim 3, wherein the movable clamping members can be moved into a neutral position by resetting means.

16. Apparatus as claimed in claim 15, wherein the resetting means are formed such that they provide an unobstructed view through the openings provided in the clamping means.

17. Apparatus as claimed in claim 15, wherein the resetting means comprise spring means, which spring means are pivotally connected to the clamping members by means of connecting means.

18. Apparatus as claimed in claim 3, wherein the clamping means comprise two clamping members movable relative to each other.

19. Apparatus as claimed in claim 2, wherein the transport system comprises a feed conveyor which can be driven at relatively slow speed.

20. Apparatus as claimed in claim 19, wherein the separating device is driveable at higher speed than the transport system for supplying pieces of carpet.

21. Apparatus as claimed in claim 2, wherein the separating device comprises two or more conveyors disposed at a relatively small angle to the horizontal.

22. Apparatus as claimed in claim 21, wherein the separating device is driveable at higher speed than the transport system for supplying pieces of carpet.

23. Apparatus as claimed in claim 2, wherein the separating device is driveable at higher speed than the transport system for supplying pieces of carpet.

24. Apparatus as claimed in claim 2, wherein the guide system comprises a guide rail.

25. Apparatus as claimed in claim 2, wherein the clamping means comprise two clamping members movable relative to each other.

* * * * *